United States Patent
Ringdahl

(10) Patent No.: US 12,000,703 B2
(45) Date of Patent: Jun. 4, 2024

(54) METHOD, SOFTWARE PRODUCT, AND SYSTEM FOR DETERMINING A POSITION AND ORIENTATION IN A 3D RECONSTRUCTION OF THE EARTH'S SURFACE

(71) Applicant: SAAB AB, Linköping (SE)

(72) Inventor: Viktor Ringdahl, Linköping (SE)

(73) Assignee: SAAB AB, Linköping (SE)

( * ) Notice: Subject to any disclaimer, the term of this patent is extended or adjusted under 35 U.S.C. 154(b) by 0 days.

(21) Appl. No.: 18/553,806

(22) PCT Filed: Apr. 12, 2022

(86) PCT No.: PCT/SE2022/050366
§ 371 (c)(1),
(2) Date: Oct. 3, 2023

(87) PCT Pub. No.: WO2022/220729
PCT Pub. Date: Oct. 20, 2022

(65) Prior Publication Data
US 2024/0085186 A1 Mar. 14, 2024

(30) Foreign Application Priority Data
Apr. 15, 2021 (SE) .................................. 2100063-3

(51) Int. Cl.
*G01C 21/16* (2006.01)
*G01C 21/00* (2006.01)
(Continued)

(52) U.S. Cl.
CPC ....... *G01C 21/1656* (2020.08); *G01C 21/005* (2013.01); *G06T 7/75* (2017.01);
(Continued)

(58) Field of Classification Search
CPC .... G01C 21/1656; G01C 21/005; G06T 7/75; G06T 15/04; G06T 17/05; G06T 2207/10032; G06T 2207/30181
See application file for complete search history.

(56) References Cited

U.S. PATENT DOCUMENTS 11,024,054 B2 * 6/2021 Lawlor ..................... G06T 7/80
2008/0050011 A1 * 2/2008 Ofek ....................... G06T 15/04
382/154

(Continued)

FOREIGN PATENT DOCUMENTS

CN 111693028 A 9/2020
CN 112862966 A 5/2021
(Continued)

OTHER PUBLICATIONS

Dall'Asta et al, E. Unmanned Aerial Systems and DSM Matching for Rock Glacier Monitoring, Google Scholar, Elsevier, ISPRS Journal of Photogrammetry and Remote Sensing, vol. 127, May 2017, p. 102-114. (Year: 2017).*

(Continued)

*Primary Examiner* — Russell Frejd
(74) *Attorney, Agent, or Firm* — Alston & Bird LLP

(57) ABSTRACT

The present disclosure relates to a method for determining a position and an orientation. The method (300) comprises the steps of obtaining (310) sensor data (210) comprising a plurality of images of Earth's surface from at least one calibrated camera; forming (320) a 3D reconstruction (220) of apart of Earth's surface based on obtained sensor data (210); obtaining (330) from a data storage (250), source data (260) indicative of a region comprising at least said part of Earth's surface, wherein said source data (260) comprises a source digital surface model, DSM, (270) for said region, and an orthophoto (280) of said region; determining (340*a*) a sensor DSM (230) of the 3D reconstruction (220) and a
(Continued)

sensor texture (240) of the 3D reconstruction (220) based on the 3D reconstruction (220); matching (350) the sensor DSM (230) and the sensor texture (240) with the source DSM (270) and the orthophoto (280); and determining (360) the position and the orientation of the 3D reconstruction (220) based on the matching (350) of the sensor DSM (230) and the sensor texture (240) with the source DSM (270) and the orthophoto (280).

10 Claims, 5 Drawing Sheets

(51) Int. Cl.
*G06T 7/73* (2017.01)
*G06T 15/04* (2011.01)
*G06T 17/05* (2011.01)

(52) U.S. Cl.
CPC .............. *G06T 15/04* (2013.01); *G06T 17/05* (2013.01); *G06T 2207/10032* (2013.01); *G06T 2207/30181* (2013.01)

(56) References Cited

U.S. PATENT DOCUMENTS

| | | | |
|---|---|---|---|
| 2014/0362082 A1* | 12/2014 | Schpok | G06T 17/05 345/427 |
| 2018/0180416 A1* | 6/2018 | Edelman | G01C 15/002 |
| 2022/0301192 A1* | 9/2022 | Boardman | G06T 7/579 |

FOREIGN PATENT DOCUMENTS

| | | |
|---|---|---|
| CN | 113066173 A | 7/2021 |
| KR | 20190051704 A | 5/2019 |
| WO | WO 2008/024189 A1 | 2/2008 |
| WO | WO 2010/068186 A1 | 6/2010 |
| WO | WO 2012/057923 A1 | 5/2012 |
| WO | WO 2015/160289 A1 | 10/2015 |
| WO | WO 2020/101156 A1 | 5/2020 |

OTHER PUBLICATIONS

Aguilar et al, M. Geometric Accuracy Assessment of Deimos-2 Panchromatic Stereo Pairs: Sensor Orientation and Digital Surface Production, Google Scholar, MDPI/Journal/Sensors, Dec. 2020, p. 1-17. (Year: 2020).*

Grossberg et al, S. A Laminar Cortical Model of Stereopsis and Three-Dimensional Surface Perception, Google Scholar, Pergamon, Vision Research, Mar. 2003, p. 801-829. (Year: 2003).*

Growe*, Stefan, et al., "3D Visualization and Evaluation of Remote Sensing Data", Jun. 22, 1998, retrieved from the Internet at http://citeseerx.ist.psu.edu/viewdoc/download;jsessionid-FF48CD145F8425FFD7B27B954229191D?doi=10.1.1.45.1644&rep=rep1&type=pdf, 11 pages. (*WIPO's International Search Report incorrectly identifies "Grove" as the author.).

Honkavaara, Eija, et al., "Band registration of tuneable frame format hyperspectral UAV imagers in complex scenes", ISPRS Journal of Photogrammetry and Remote Sensing, Nov. 6, 2017, pp. 96-110, vol. 134, Elsevier BV, Netherlands.

International Searching Authority, International Search Report and Written Opinion received for International Application No. PCT/SE2022/050366, dated May 13, 2022, 14 pages, Swedish Patent and Registration Office, Sweden.

Swedish Patent and Registration Office, Search Report received for Application No. SE 2100063-3, dated Nov. 5, 2021, 3 pages, Sweden.

* cited by examiner

METHOD, SOFTWARE PRODUCT, AND SYSTEM FOR DETERMINING A POSITION AND ORIENTATION IN A 3D RECONSTRUCTION OF THE EARTH'S SURFACE

CROSS REFERENCE TO RELATED APPLICATIONS

This application is a National Stage Application, filed under 35 U.S.C. § 371, of International Application No. PCT/SE2022/050366, filed Apr. 12, 2022, which international application claims priority to and the benefit of Swedish Application No. 2100063-3, filed Apr. 15, 2021; the contents of both of which are hereby incorporated by reference in their entirety.

TECHNICAL FIELD

The present disclosure relates to GPS-free localization and navigation

BACKGROUND

Historically the challenge of determining ones position was solved by observing the surrounding environment and, if available, identifying some known objects from which ones own position could be determined. One such historically important technique is celestial navigation which utilizes celestial bodies, such as the sun, the moon or stars, to determine a position.

In modern times several types of position determining systems are arranged to receive information via wireless communication from remote man-made systems in order to determine a position. The receive information may be intended specifically for said position determining system, or may be part of a one-way communication intended for a large number or receivers, such as signals from the Global Positioning System (GPS).

Position determining systems requiring information obtained wirelessly from a remote sender may fail to function if the sender stops functioning, the system's receiver stops functioning and/or other electromagnetic radiation interferes with the sent information at the receiver, such as interfering electromagnetic radiation due to electronic warfare. There is a need for improved systems for determining positioning and orientation which function independently of information from remote systems.

SUMMARY

One object of the invention is to provide improved GPS-free localization and navigation.

This has in accordance with the present disclosure been achieved by means of a method for determining a position and an orientation. The method comprises the steps of obtaining sensor data comprising a plurality of images of Earth's surface from at least one calibrated camera; forming a 3D reconstruction of a part of Earth's surface based on obtained sensor data; obtaining from a data storage, source data indicative of a region comprising at least said part of Earth's surface, wherein said source data comprises a source digital surface model, DSM, for said region, and an orthophoto of said region. The source DSM and said orthophoto are defined in relation to a predetermined coordinate system. The method further comprises determining a sensor DSM of the 3D reconstruction and a sensor texture of the 3D reconstruction based on the 3D reconstruction; matching the sensor DSM and the sensor texture with the source DSM and the orthophoto, wherein matching comprises finding a position and an orientation of the sensor DSM and the sensor texture in the source DSM and the orthophoto; and determining the position and the orientation of the 3D reconstruction in said predetermined coordinate system based on the matching of the sensor DSM and the sensor texture with the source DSM and the orthophoto.

The formed sensor DSM and the sensor texture represent the shape and the spectral properties of said part of Earth's surface respectively, and may be compared to the source DSM and the orthophoto which typically represent a significantly larger region of Earth's surface. By attempting to find a position and an orientation of the sensor DSM that matches somewhere in the source DSM, attempting to find a position and an orientation of the sensor texture in the orthophoto, or a combination thereof, the position and the orientation of the 3D reconstruction in a predetermined coordinate system related to the source data may be determined. Determining the position and the orientation of the 3D reconstruction in the predetermined coordinate system may be equivalent to determining the position and the orientation in the predetermined coordinate system of an aircraft comprising said at least one calibrated camera, if a geometric relationship between the aircraft and the 3D reconstruction is known.

This has the advantage of allowing a flying platform to determine a position and an orientation based on a plurality of images captured from said flying platform. This further allows a formed 3D reconstruction of a part of Earth's surface based on sensor data to determine a position and orientation of entities with a known relationship with said 3D reconstruction, such as a flying platform comprising said camera.

In some examples the method further comprises determining a two-channel sensor map. The first channel of the sensor map is the sensor DSM or a transformation thereof. The second channel of the sensor map is the sensor texture or a transformation thereof. The method further comprises determining a two-channel source map. The first channel of the source map is the source DSM or a transformation thereof. The second channel of the source map is the orthophoto or a transformation thereof. The step of matching comprises matching the sensor map with the source map.

It is to be understood that matching process is arranged to find the position and orientation of the smaller two-channel sensor map in the larger two-channel source map.

This has the advantage of allowing the DSM height information and the surface texture information to be matched simultaneously. This further allows matching to be improved by utilizing algorithms configured to take advantage of the 2-channel information to find the sensor map inside the source map, which corresponds to finding the part of Earth's surface represented by the sensor data inside the region of Earth's surface represented by the source data.

In some examples the method further comprises determining a refined position and a refined orientation of the determined position and the determined orientation of the 3D reconstruction based on matching the 3D reconstruction with height information of the source DSM at at least the determined position and/or in the determined orientation.

This has the advantage of allowing the determined orientation and position to be utilized to perform a refined high-resolution matching in space significantly smaller than the region corresponding to the source data. This further has the advantage of allowing the matching of the sensor DSM and the sensor texture with the source DSM and the orthophoto to be performed at a reduced spatial resolution, thereby lowering computational complexity, and after determining the position and the orientation performing the refined matching at a significantly higher spatial resolution in a space based on the determined position and orientation.

In some examples the method obtains said sensor data comprising the plurality of images of Earth's surface and corresponding navigation data obtained from an inertial navigation system (INS) and/or an inertial measurement unit (IMU).

This has the advantage of allowing an improved 3D reconstruction to be formed based on the plurality of images and the corresponding navigation data. This further has the advantage of allowing a flying platform comprising said camera and INS and/or IMU to improve determining changes in movement and orientation of said flying platform and/or said camera during capture of said plurality of images.

In some examples the method, obtaining sensor data further comprises obtaining at least one gravity vector indicative of a downward direction. Determining the sensor DSM of the 3D reconstruction and the sensor texture of the 3D reconstruction is further based on said at least one gravity vector.

This has the advantage of allowing the sensor DSM and the sensor texture to be determined in an orientation corresponding to substantially the same downward direction as the source DSM and the orthophoto, whereby matching may be improved. This further has the advantage of allowing the matching to have reduced computational complexity as some orientations of the sensor DSM and sensor texture may be excluded based on the obtained at least one gravity vector.

In some examples the method, forming the 3D reconstruction of the part of Earth's surface utilizes a Simultaneous Localization and Mapping, SLAM, algorithm.

This has the advantage of allowing an unknown environment be mapped based on sensor data to form a 3D reconstruction, the unknown environment herein being a part of Earth's surface.

In some examples of the method, the machine learning algorithm used for matching is a one-shot detection network based one-shot learning arranged to find the part of Earth's surface corresponding to the sensor data inside the region of Earth's surface corresponding to the source data.

This has the advantage of allowing matching to have a reduced computational complexity. This further has the advantage of improving matching of rotated parts of Earth's surface corresponding to the sensor data with the region of Earth's surface corresponding to the source data. This further has the advantage of allowing robust matching when sensor data and source data represents different condition, such as representing different seasons or weather.

The present disclosure further relates to a computer program product comprising a non-transitory computer-readable storage medium having thereon a computer program comprising program instructions. The computer program being loadable into a processor and configured to cause the processor to perform the method for determining a position and an orientation.

The present disclosure further relates to a system for determining a position and an orientation. The system comprising a set of sensors, a processor and a data storage. The data storage and the set of sensors are connected to the processor. The set of sensors comprises a set of cameras arranged to capture a plurality of images of Earth's surface and comprises an inertial navigation system (INS) and/or an inertial measurement unit (IMU) arranged to determine changes in position and orientation of the system. The set of sensors is arranged to provide sensor data comprising said plurality of images and corresponding navigation data indicative of changes in position and orientation to the processor. The memory storage is arranged to provide source data for at least some of Earth's surface to the processor. The source data comprises a source DSM indicative of the height of Earth's surface and a corresponding orthophoto of Earth's surface. The processor is arranged to obtain sensor data from the set of sensors;

form a 3D reconstruction of a part of Earth's surface based on obtained sensor data;

obtain source data corresponding to a region comprising at least said part of Earth's surface from the data storage, wherein said source data comprises a corresponding source digital surface model, DSM, and a corresponding orthophoto in a predetermined coordinate system;

determine a sensor DSM and a sensor texture based on the formed 3D reconstruction;

match the sensor DSM and the sensor texture with the source DSM and the orthophoto;

wherein matching comprises finding a position and an orientation of the sensor DSM and the sensor texture in the source DSM and the orthophoto; and determine a position and an orientation of the 3D reconstruction in said predetermined coordinate system of the source data based on said matching.

This has the advantage of allowing the system to know its own position and orientation upon determining the position and the orientation of the 3D reconstruction based on the sensor data.

In some examples of the system, the processor is further arranged to determine a two-channel sensor map, wherein the first channel of the sensor map is the sensor DSM or a transformation thereof, and wherein the second channel of the sensor map is the sensor texture or a transformation thereof;

determine a two-channel source map, wherein the first channel is the source DSM or a transformation thereof, and wherein the second channel is the orthophoto or a transformation thereof;

match the sensor map with the source map; and determine the position and the orientation of the 3D reconstruction based on the matching of the sensor map with the source map.

DETAILED DESCRIPTION

Figure 1A:
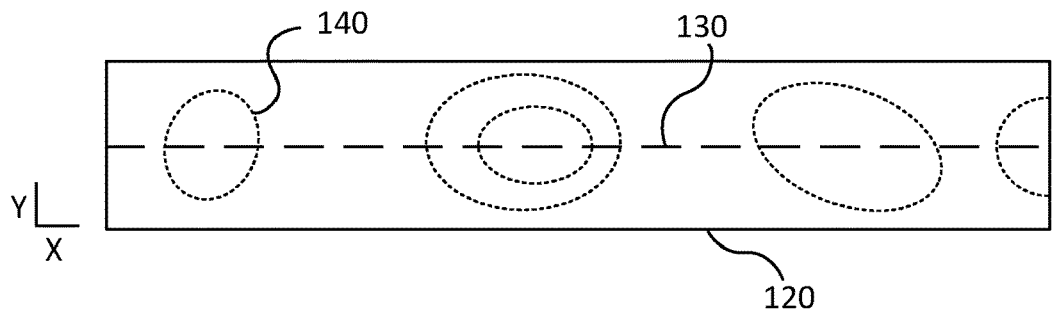
FIG. 1a-d illustrate 3D reconstructions, digital surface models and orthophotos.

Throughout the figures, same reference numerals refer to same parts, concepts, and/or elements. Consequently, what will be said regarding a reference numeral in one figure applies equally well to the same reference numeral in other figures unless not explicitly stated otherwise.

Figure 1B:
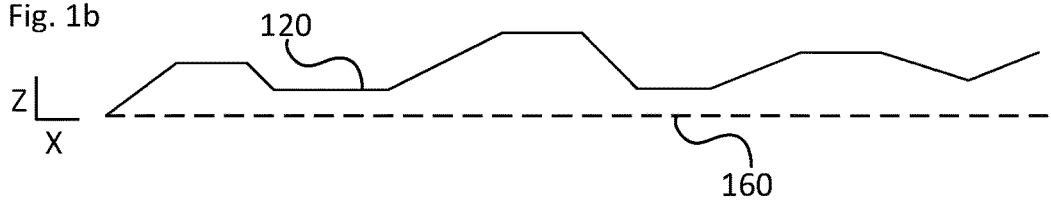
Figure 1C:
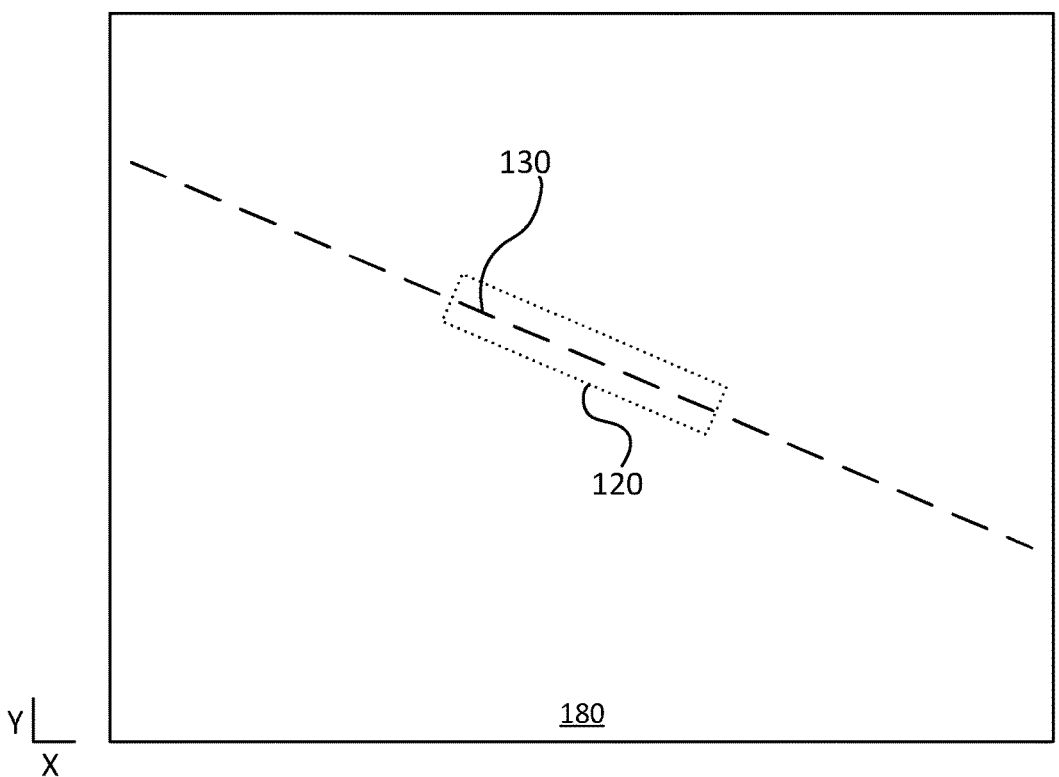
Figure 1D:
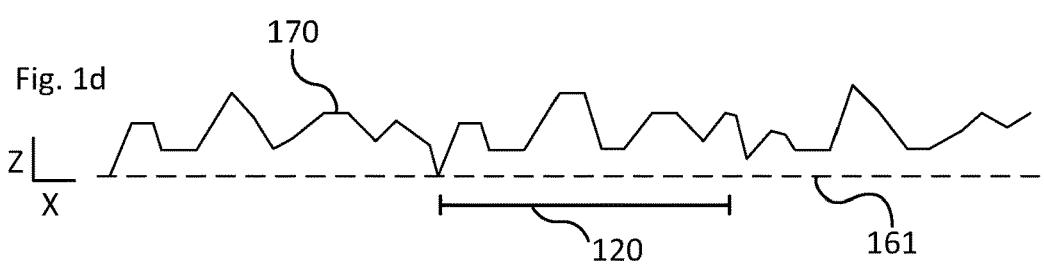

FIG. 1a-d illustrate 3D reconstructions, digital surface models and orthophotos indicative of Earth's surface. FIG. 1a-b relate to a 3D reconstruction, and sensor digital surface model (DSM) and sensor textures. FIG. 1c illustrates schematically an orthophoto of a region of Earth's surface, and FIG. 1d illustrates a side view of a source digital surface model corresponding to said orthophoto. The invention relates to obtaining, determining and matching digital surface models, surface textures and orthophotos in order to determine a position and an orientation.

A plurality of camera images of Earth's surface and the relative pose of camera(s) during capture of said camera images may be used to form a local 3D reconstruction of part of Earth's surface. The 3D reconstruction may have shape and colour indicative of the shape and the colour of the part of Earth's surface as captured by the plurality of images. In some examples the plurality of camera images are images captured from an aircraft travelling above the ground. In some example the relative pose is determined based on navigation data indicative of the movement of a flying platform capturing said images, such as an aircraft's velocity and rotation during the time period of capturing said images. Typically the process of forming the 3D reconstruction establishes a relationship between the 3D reconstruction's positions and orientation and a camera's positions and orientation for at least some camera images.

FIG. 1a illustrates a top down view of an example 3D reconstruction 120 of part of Earth's surface. In this example the 3D reconstruction 120 has been formed based on a plurality of images captured by calibrated cameras fixedly mounted on an aircraft traveling along a straight path 130, thereby forming a 3D reconstruction 120 that extends furthest in the direction of said path 130. The illustration of the top down view of the 3D reconstruction 120 shows height lines 140 indicating the changes in the height of the 3D reconstruction 120.

FIG. 1b illustrates a side view of the example 3D reconstruction 120 of part of Earth's surface, wherein the side view is a cross section along the path 130 travelled by the aircraft as seen in FIG. 1a. The side view shows the height of the 3D reconstruction 120 cross section relative to a determined height baseline 160. Said height baseline 160 may be determined without knowing a corresponding downward direction according to a global reference frame, in such situations an approximate downward direction is typically known.

The 3D reconstruction represents a surface in three-dimensional space, said surface typically comprises values (not shown) indicative of the spectral properties of the corresponding part of Earth's surface. In some examples wherein the plurality of images are colour images, the 3D reconstruction surface comprises a texture representing the colours of said part of Earth's surface mapped onto the 3D reconstruction surface. In some examples the plurality of images comprise infrared images.

FIG. 1c illustrates an orthophoto 180 of a region of Earth's surface. In this example the orthophoto 180 is indicative of a region comprising the part of Earth's surface that the 3D reconstructions 120 in FIG. 1a-b represents. Typically the orthophoto 180 represents a region of Earth's surface that is significantly larger than the part of Earth's surface that the 3D reconstructions 120 represents. The orthophoto 180 is a 2D image that visually represents the region of Earth's surface as if viewed from above. In this illustration the travelled path 130 of the aircraft in FIG. 1a has been superimposed on the orthophoto 180.

FIG. 1d illustrates a side view of a cross section of a digital surface model 170 corresponding to the region of Earth's surface in the orthophoto 180, from hereon called the source DSM 170. In this example the cross section is along a line that corresponds to the travelled path 130 in FIG. 1c. The source DSM 170 is indicative of the surface height in the region in relation to a height baseline 161. The source DSM 170 represents a surface in a three-dimensional space.

The orthophoto 180 and the source DSM 170 are typically defined in relation to a predetermined coordinate system, such as a geographic coordinate system.

Returning to the 3D reconstruction 120 in FIG. 1a-b. Based on the 3D reconstruction 120 a sensor DSM (not shown) in a format comparable to the source DSM 170 may be formed for said part of Earth's surface represented by the 3D reconstruction 120. The sensor DSM is indicative of the surface shape of the 3D reconstruction 120, such as the 3D reconstruction 120 without the spectral properties of the surface. The determined height baseline 160 for the 3D reconstruction 120 may differ in orientation from the height baseline 161 for the source DSM 170, thus resulting in a tilted sensor DSM in relation to the source DSM 170. Preferably a downward direction is known when determining the sensor DSM and sensor texture whereby their downward directions are substantially the same as the downward directions of the source DSM 170 and the orthophoto 180.

Based on the 3D reconstruction 120 a sensor texture (not shown) in a format comparable to the orthophoto 180 may be formed for said part of Earth's surface. The sensor texture is a 2D image indicative of the spectral properties of the surface of the 3D reconstruction 120, such as an orthorectified image of the 3D reconstruction 120. Preferably a formed sensor texture represents a top-down view of the 3D reconstruction 120 based on a determined downward direction.

It is to be understood that there is a known geometrical relationship between the 3D reconstruction and the corresponding formed sensor DSM and sensor texture, such that if a position and orientation of the sensor DSM becomes known then the position and orientation of the 3D reconstruction is also known.

The formed sensor DSM and the sensor texture represent the shape and the spectral properties of said part of Earth's surface respectively, and may be arranged to be compared to the source DSM 170 and the orthophoto 180 which typically represent a significantly larger region of Earth's surface. By attempting to find a position and an orientation of the sensor DSM 130 that matches somewhere in the source DSM 170, attempting to match the sensor texture 140 and the orthophoto 180, or a combination thereof, the position and the orientation of the 3D reconstruction 120 in a predetermined coordinate system related to the source data may be determined. Determining the position and the orientation of the 3D reconstruction 120 in the predetermined coordinate system may be equivalent to determining the position and the orientation of the aircraft in the predetermined coordinate system if a geometric relationship between the aircraft and the 3D reconstruction 120 is known.

In this example the sensor DSM corresponding to FIG. 1b has been compared with the source DSM 170 in FIG. 1d, and a match has been identified as indicated by the region representing the 3D reconstruction 120. This example illustrates comparing two lines representing height, whereas the sensor DSM and source DSM 170 are typically compared as surfaces. In FIG. 1c the identified match is shown as an area representing the 3D reconstruction 120 in the orthophoto 180. This example illustrates comparing the sensor DSM and the source DSM 170, whereas the matching preferably involves combining the sensor DSM and sensor texture into a two-channel sensor map, and simultaneously comparing said sensor map with a corresponding two-channel source map defined by the source DSM 170 and the orthophoto 180.

Figure 2A:
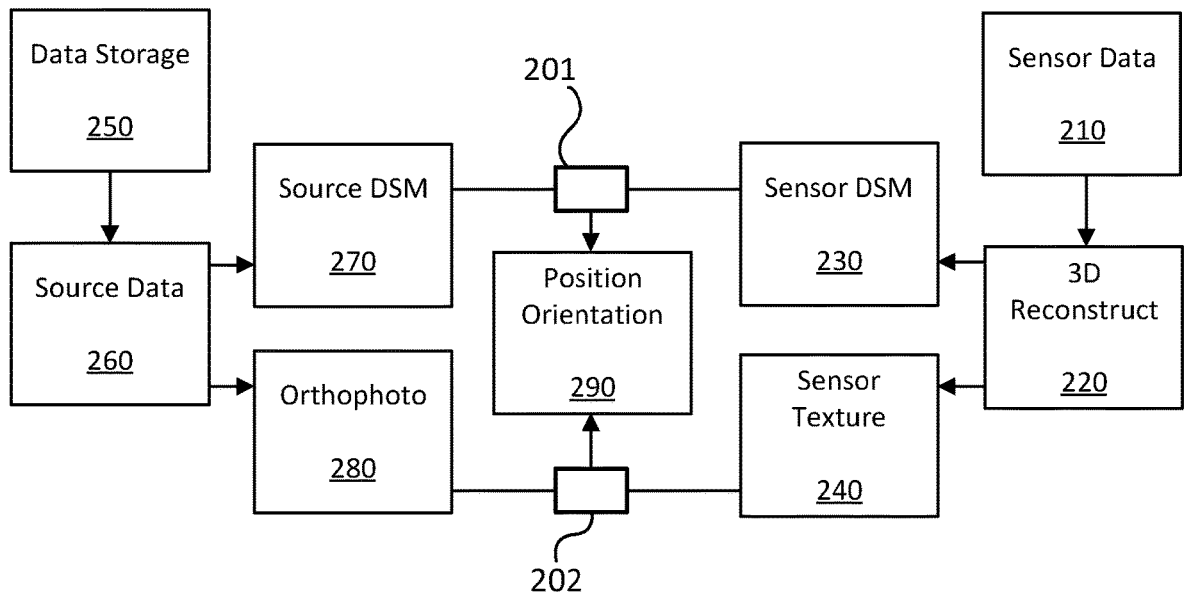
FIG. 2a-b depicts schematically flowcharts for comparing source data and sensor data.
Figure 2B:
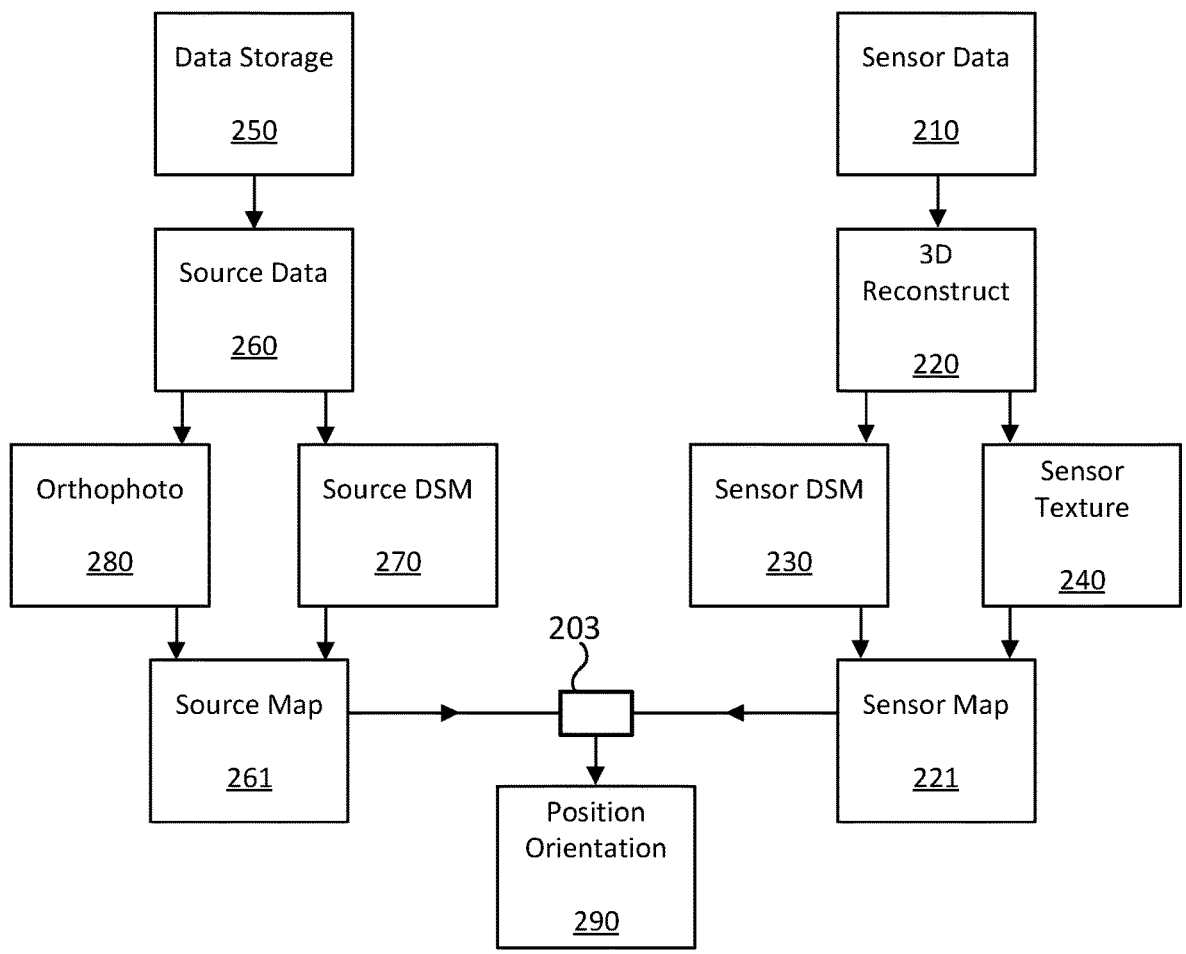

FIG. 2a-b depicts schematically example flowcharts for comparing source data 260 and sensor data 210 for determining a position and an orientation of a flying platform. The example flowcharts depict schematically how the information of the source data 260 and the sensor data 210 is processed and converted to corresponding formats in order to be efficiently compared and matched.

The sensor data 210 comprises measurement data obtained by sensors indicative of the environment and/or navigation data indicative of the changes in position and orientation of the flying platform comprising said sensors. Sensor data 210 comprises images of Earth's surface. A 3D reconstruction 220 representing a part of Earth's surface is formed based on the sensor data 210 in a local coordinate system, wherein the 3D reconstruction 220 comprises a surface with pixel values indicative of spectral properties of said part of Earth's surface. Based on said 3D reconstruction 220 a sensor DSM 230 and a sensor texture 240 is formed. The sensor DSM 230 is a surface in a three-dimensional space indicative of the shape of the 3D reconstruction 220. The sensor texture 240 is a 2D image of the 3D reconstruction 220, such as an orthorectified top-down image of the 3D reconstruction 220.

The sensor data 210 may further comprise at least one camera pose relative to the flying platform corresponding to said images of Earth's surface. The sensor data 210 may further comprise at least one gravity vector corresponding to said images of Earth's surface indicative of a downward direction. The at least one gravity vector may be determined based on the plurality of images and/or navigation data comprising acceleration data, such as data from an inertial navigation system (INS) and/or an inertial measurement unit (IMU).

The source data 260 for a region of Earth's surface is obtained from a data storage 250, for example being obtained from a database and/or extracted from a computer generated model of Earth's surface. It is to be understood that the obtained source data 260 for matching with the 3D reconstruction 220 may be a subset of all the source data 260 in the data storage 250. The obtained source data 260 comprises a source DSM 270 for said region of Earth's surface and an orthophoto 280 of said region. The area of the region corresponding to the obtained source data 260 is typically several orders of magnitude larger than the area of the part of Earth's surface represented by the 3D reconstruction 220. The region may be selected based on an assumed position of where the sensor data 210 was obtained, and a determined uncertainty in said assumed position. In these examples an assumption may be made that some approximate knowledge of where on Earth the sensor data 210 was obtained is available, such as being within a radius of 100 km from a position.

FIG. 2a depicts a first example flowchart for comparing source data 260 and sensor data 210 for determining the position and the orientation. In this example the sensor data 210 comprising a plurality of images in the visible spectrum is used to form a 3D reconstruction 220 of said part of Earth's surface. A sensor DSM 230 and a sensor texture 240 are determined based on the formed 3D reconstruction 220. The sensor DSM 230 is indicative of the surface shape of the 3D reconstruction 220, and the sensor texture 240 is a 2D image indicative of an orthophoto of the 3D reconstruction 220 in the visible spectrum. In a preferred example the sensor texture 240 corresponds to a top-down view of the 3D reconstruction 220. In some examples the sensor texture 240 is formed based on the 3D reconstruction 220 and a determined gravity vector indicative of a downward direction. In some examples the gravity vector is determined based on the plurality of images and/or the navigation data.

The data storage 250 comprises source data 260 for at least part of Earth's surface. The source data 260 obtained from the data storage 250 comprises a source DSM 270 for a region of Earth's surface and an orthophoto 280 of said region, wherein said region comprises the part of Earth's surface represented by the 3D reconstruction 220. In the first flowchart example depicted in FIG. 2a the sensor DSM 230 is compared with the source DSM 270 in a matching process 201, and the sensor texture 240 is compared with the orthophoto 280 in a corresponding matching process 202. The position and the orientation of the 3D reconstruction 220 is determined 290 based on the results of the two matching processes 201,202.

FIG. 2b depicts a second example flowchart for comparing source data 260 and sensor data 210 for determining the position and the orientation. The second example flowchart represents a preferred embodiment of the invention.

The second example flowchart in FIG. 2b differs from the first example in FIG. 2a in that the source DSM 270 and orthophoto 280 define a two-channel map of said region, hereon called the source map 261. Correspondingly the sensor DSM 230 and the sensor texture 240 define a sensor map 221 of the part of Earth's surface represented by the 3D reconstruction. In the second example flowchart in FIG. 2b the sensor map 221 is compared with the source map 261 in a matching process 203, wherein matching process 203 is arranged to find the position and orientation of the smaller two-channel sensor map 221 in the larger two-channel source map 261. The source map 261 may have a lower spatial resolution per unit length than the corresponding source data 260 comprised in the data storage 250. The sensor map 221 may have a spatial resolution per unit length substantially the same as the source map 261. Comparing maps 221,261 with reduced spatial resolution may allow for a matching processes that is less computationally complex and/or that more rapidly determines the position and the orientation. It is to be understood that it may be logically equivalent to determine a map 221,261 of a lower spatial resolution for an algorithm to process, and to have the algorithm down-sample the map 221,261 during the process.

In a preferred embodiment the sensor map 221 is defined by the sensor DSM 230 and the sensor texture 240, wherein the sensor texture 240 represents an orthophoto of the 3D reconstruction 220 based on a gravity vector indicative of a downward direction determined based on navigation data comprising acceleration data. The sensor texture 240 may represent a perspective of the 3D reconstruction with a significantly different angle of view than the top-down orthophoto 280 perspective of Earth's surface, however, such a difference in angle may result in the matching process 203 being significantly more computationally complex.

In some embodiments the matching process 203 is performed by a one-shot detection network based one-shot learning arranged to find the two-channel sensor map 221 in the two-channel source map 261.

The term predetermined coordinate system refers to a coordinate system that is independent of the position of the camera or the flying platform. The predetermined coordinate system may for example be the conventional terrestrial coordinate system. In some examples the predetermined coordinate system is the coordinate system the source data is defined in.

The term local coordinate system refers to a coordinate system defined in relation to the camera's or the flying platform's position and orientation. The local coordinate system may be defined based on the position of the camera or the flying platform at some point in time. Typically a local coordinate system, upon being defined, does not have a precise relationship with any predetermined coordinate systems, such as a coordinate system based on the World Geodetic System, WGS84.

The term sensor data refers to sensor information relating to the environment and the flying platform. The sensor data may for example be digital camera images of Earth's surface and acceleration data from an IMU/INS.

The term calibrated camera refers to a camera with calibrated intrinsic parameters.

The term navigation data refers to information indicative of the movement of a camera and/or the flying platform comprising said camera. The navigation data may be obtained from an inertial navigation system (INS) or an inertial measurement unit (IMU). The navigation data may be indicative of a pose of a camera at two points in time in a local coordinate system.

The term 3D reconstruction refers to a surface in a 3D space. The 3D reconstruction may for example be a surface defined by a mesh and/or by a set of voxels.

The term orthophoto refers to an image of a scene wherein each pixel of said image corresponds to viewing said scene from straight above. Orthophoto may relate to one orthophoto or a union of orthophotos, such as an orthophoto of a region being a union of orthophotos corresponding to one orthophoto of said region. The orthophoto may for example be an orthorectified satellite image of Earth's surface based on one or more satellite images.

The term region of Earth's surface refers to the region to which the obtained source data relates. The region of Earth's surface is typically several orders of magnitude larger than the corresponding part of Earth's surface represented by the 3D reconstruction. The region of Earth's surface is typically selected such that said region has a high probability of comprising the corresponding part of Earth's surface represented by the 3D reconstruction.

The term matching processes refers to finding the part of Earth's surface corresponding to the sensor data in the region of Earth's surface corresponding to the source data. The matching processes may for example comprise a simultaneous 2-channel matching of the source DSM with the sensor DSM, and the orthophoto with the source texture.

The terms sensor map and source map refers to a two-channel maps comprising shape and spectral information relating to Earth's surface. The sensor map channels may for example be the sensor DSM and sensor texture respectively. The source map channels may for example be the source DSM and the orthophoto respectively.

The terms "[data] or a transformation thereof" refers to said data after any resampling, truncating, rotating, changing spatial resolution per unit length, or other standard operation suitable to transform a two dimensional coordinate system comprising pixel values, such as a digital two-dimensional orthophoto of Earth's surface. The values comprised in the "transformation thereof" are only based on the values of said data.

Figure 3:
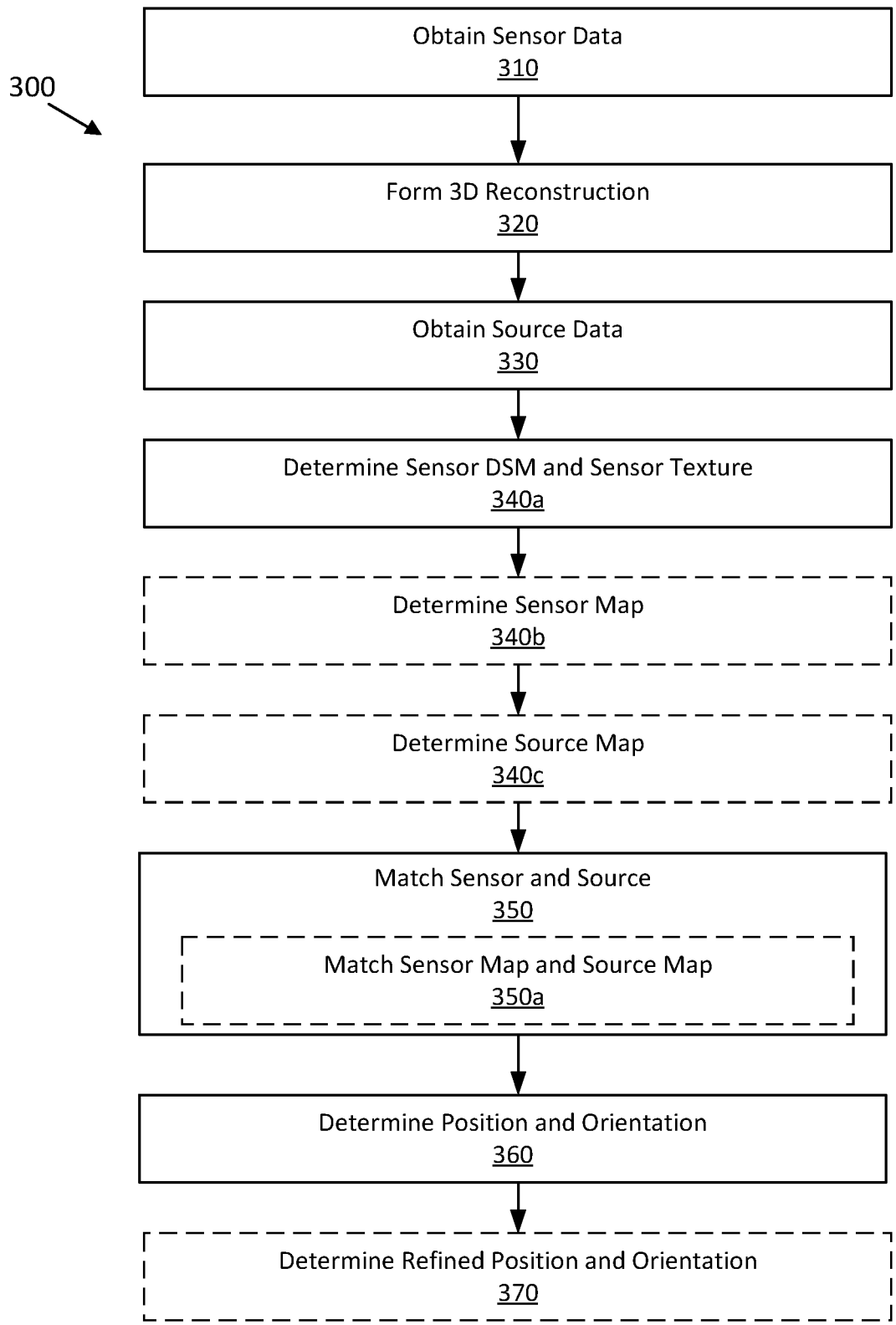
FIG. 3 depicts schematically a method for determining a position and an orientation.

FIG. 3 depicts a method for determining a position and an orientation, the method 300 comprises the steps of
  obtaining 310 sensor data comprising a plurality of images of Earth's surface from at least one calibrated camera,
  forming 320 a 3D reconstruction of a part of Earth's surface based on obtained sensor data,
  obtaining 330 from a data storage, source data indicative of a region comprising at least said part of Earth's surface, wherein said source data comprises
    a source digital surface model, DSM, for said region, and
    an orthophoto of said region,
wherein said source DSM and said orthophoto are defined in relation to a predetermined coordinate system,
  determining 340a a sensor DSM of the 3D reconstruction and a sensor texture of the 3D reconstruction based on the 3D reconstruction,
  matching 350 the sensor DSM and the sensor texture with the source DSM and the orthophoto, and
  determining 360 the position and the orientation of the 3D reconstruction in said predetermined coordinate system based on the matching 350 of the sensor DSM and the sensor texture with the source DSM and the orthophoto.

It is to be understood that determining 360 the position and the orientation of the 3D reconstruction in a predetermined coordinate system is equivalent to determining the position and the orientation of the camera and/or a flying platform comprising said camera if a geometric relationship between them is known. Said geometric relationship is typically known as the method utilizes a plurality of images and/or navigation data corresponding to said camera and/or said flying platform to form 320 said 3D reconstruction.

Some embodiments of the method further comprises determining 340b a two-channel sensor map, wherein the first channel of the sensor map is the sensor DSM or a transformation thereof, and wherein the second channel of the sensor map is the sensor texture or a transformation thereof, and
  determining 340c a two-channel source map, the first channel is the source DSM or a transformation thereof, and wherein the second channel is the orthophoto or a transformation thereof, and
  wherein matching 350 comprises matching 350a the sensor map with the source map, and wherein determining 360 the position and the orientation of the 3D reconstruction is based on said matching.

Some embodiments of the method further comprises determining 370 a refined position and a refined orientation of the 3D reconstruction in said predetermined coordinate system based on matching the 3D reconstruction with height information of the source DSM at at least the determined position and/or in the determined orientation. It is to be understood that the source DSM matched with the 3D reconstruction may be a different source DSM with higher spatial resolution per unit length than the source DSM matched against the sensor DSM and sensor texture.

Some embodiments of the method further comprises determining 370 a refined position and a refined orientation of the 3D reconstruction in said predetermined coordinate system based on matching the 3D reconstruction and/or sensor texture with said orthophoto at at least the determined position and/or in the determined orientation. It is to be understood that the orthophoto matched with the 3D reconstruction and/or sensor texture may be a different orthophoto with higher spatial resolution per unit length than the orthophoto matched against the sensor DSM and sensor texture.

In some embodiments of the method the steps of matching 350 and determining 360 the position and the orientation are iterated utilizing an updated orthophoto and an updated source DSM with progressively higher spatial resolution per unit length corresponding to a progressively smaller sub-regions of said region until at least one criteria is fulfilled.

In some embodiments of the method the step of matching 350 comprises extracting at least one feature vector from the sensor map and extracting at least one feature vector from the source map, and matching said extracted feature vectors. The feature vectors being representations of the maps in a feature space. In some of these embodiments one feature vector from the sensor map and one feature vector from the source map are extracted and matched. In some embodiments feature vectors are extracted from maps utilizing One Shot Learning.

In some embodiments of the method, obtaining 310 sensor data comprises obtaining a plurality of images of Earth's surface and further obtaining corresponding navigation data from an inertial navigation system (INS) and/or inertial measurement unit (IMU). The inertial navigation system (INS) and/or inertial measurement unit (IMU) navigation data may be indicative of differences in camera pose between images.

In some embodiments the method is a method 300 for determining a position and an orientation of a flying platform comprising said camera.

In some embodiments the method comprises obtaining an estimated position of a flying platform, and obtaining 330 source data indicative of a region comprising at least said part of Earth's surface based on said estimated position of the flying platform. In some of these embodiment the estimated position of the flying platform is obtained from a navigation system of said flying platform and/or based on a previous position and/or orientation determined by the method 300.

In some embodiments of the method, obtaining 310 sensor data further comprises obtaining at least one camera pose relative to the flying platform comprising said camera, and forming 320 the 3D reconstruction is further based on said obtained at least one pose. In some of these embodiments at least one camera is arranged on a gimbal arranged to provide camera pose.

In some embodiments forming 320 the 3D reconstruction is based on utilizing a simultaneous localization and mapping (SLAM) algorithm. In some of these embodiments of the method, wherein sensor data comprises a plurality of images of Earth's surface and corresponding navigation data, forming 320 the 3D reconstruction is based on utilizing a visual-inertial SLAM algorithm.

In some embodiments forming 320 the 3D reconstruction is based on a subset of the obtained sensor data, wherein the size of said subset in relation to the whole obtained sensor data is based on a determined value indicative of an expected simplicity of successful matching. The subset may be the whole or a true subset of the obtained sensor data. Utilizing a true subset of the obtained sensor data for forming 320 the 3D reconstruction may result in a smaller and/or more sparse 3D reconstruction, thereby reducing the computational cost of the matching 350 step.

In some embodiments determining 340a a sensor DSM of the 3D reconstruction and a sensor texture of the 3D reconstruction is based on a subset of the 3D reconstruction, wherein said subset is the whole 3D reconstruction or the 3D reconstruction truncated and/or spasified, wherein the size and/or sparsity of said subset in relation to the whole the 3D reconstruction is based on a determined value indicative of an expected simplicity of successful matching. Utilizing the 3D reconstruction truncated and/or sparsified may result in reducing the computational cost of the matching 350 step.

Figure 4:
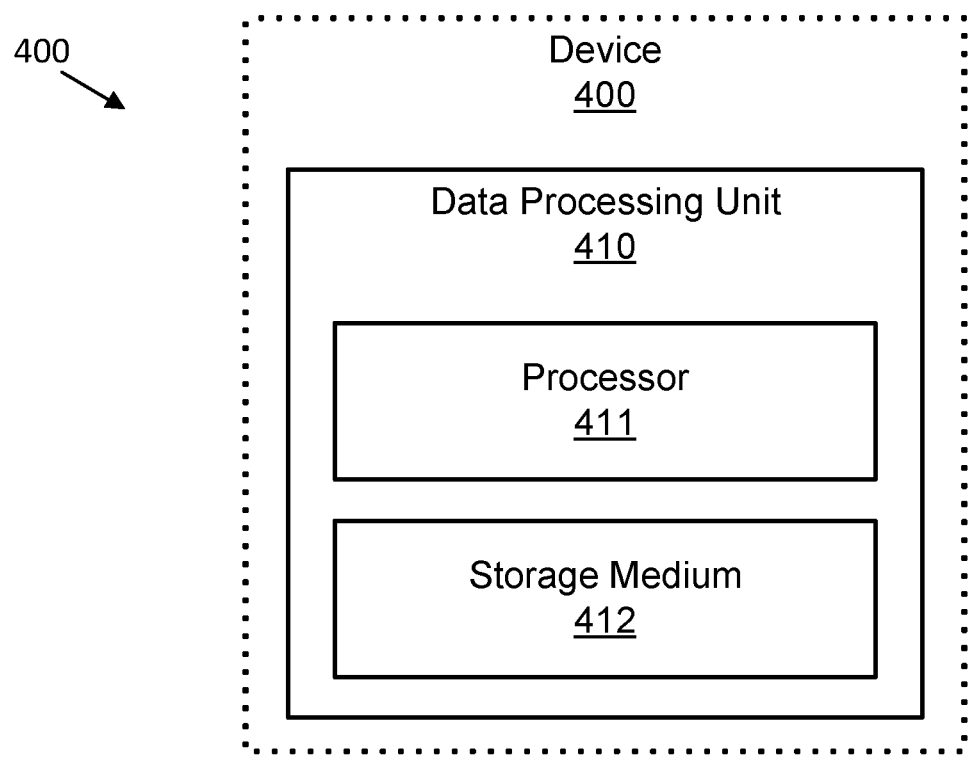
FIG. 4 depicts schematically a data processing unit comprising a computer program product.

FIG. 4 depicts schematically a data processing unit comprising a computer program product for determining a position and an orientation. FIG. 4 depicts a data processing unit 410 comprising a computer program product comprising a non transitory computer-readable storage medium 412. The non-transitory computer-readable storage medium 412 having thereon a computer program comprising program instructions. The computer program is loadable into a data processing unit 410 and is configured to cause a processor 411 to carry out the method for determining a position and an orientation accordance with the description of FIG. 3.

The data processing unit 410 may be comprised in a device 400.

The device 400 may be comprised in a flying platform, such as an aircraft.

The device 400 may be comprised in the navigation system of a flying platform, such as an aircraft.

Figure 5:
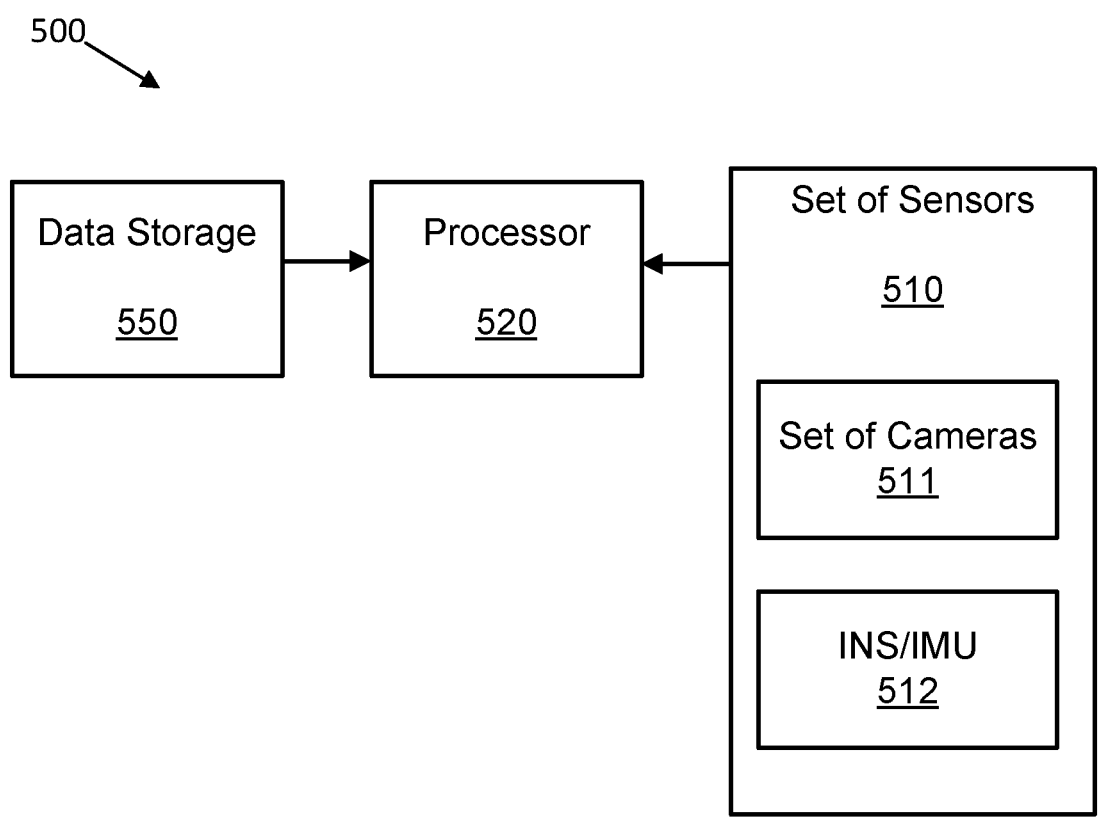
FIG. 5 depicts schematically a system for determining a position and an orientation.

FIG. 5 depicts schematically a system for determining a position and an orientation. The system 500 comprising a set of sensors 510, a processor 520 and a data storage 550. The data storage 550 and the set of sensors 510 being connected to the processor 520. The set of sensors 510 comprises a set of cameras 511 arranged to capture a plurality of images of Earth's surface, and an inertial navigation system and/or an inertial measurement unit 512 arranged provide navigation data indicative of changes in position and orientation of the system 500 during the capture of said plurality of images. The set of sensors 510 is arranged to provide sensor data comprising said plurality of images and corresponding navigation data to the processor 520. The memory storage 550 comprises source data for at least some of Earth's surface, wherein the source data comprises a source DSM indicative of the height of Earth's surface and a corresponding orthophoto of Earth's surface. The memory storage 550 is arranged to provide said source data to the processor 520.

The processor 520 being arranged to
obtain sensor data from the set of sensors 510,
form a 3D reconstruction of a part of Earth's surface based on obtained sensor data,
obtain source data indicative of a region comprising at least said part of Earth's surface from the data storage 550, wherein said source data comprises a corresponding source digital surface model, DSM, and at least one corresponding orthophoto in a predetermined coordinate system,
determine a sensor DSM and a sensor texture based on the formed 3D reconstruction,
match the a sensor DSM and a sensor texture with the source DSM and the orthophoto utilizing a one-shot detection network based one-shot learning, and
determine a position and an orientation of the 3D reconstruction in said predetermined coordinate system of the source data based on said matching.

It is to be understood that the processor 520 determining the position and the orientation of the 3D reconstruction in a predetermined coordinate system is logically equivalent to determining the position and the orientation of the camera and/or flying platform comprising said camera when a geometric relationship between the 3D reconstruction and said camera and/or flying platform is known, which is typically the case.

In order to obtain sensor data that can reliably form 3D reconstructions, the set of sensors 510 typically need to comprise either:
one calibrated camera 511 and an inertial navigation system and/or an inertial measurement unit 512, or two calibrated cameras 511.

If the set of sensors 510 only consists of two calibrated cameras 511, then the captured plurality of images would typically require some overlaps in scenes in order for the system 500 to form a useful 3D reconstruction. In some examples the system 500 is arranged on a flying platform and comprises a set of sensors 510 comprising two calibrated cameras 511, wherein said two calibrated cameras 511 are high-speed cameras arranged to capture images in rapid succession.

In some embodiments of the system, the data storage 550 comprises a computer generated model of Earth's surface and the processor 520 is arranged to obtained source data based on said computer generated model of Earth's surface.

In some embodiments the system 500 is comprised in a flying platform.

In some embodiment the system 500 is arranged to obtain an estimated position of the system 500, and the processor 520 is arranged to obtain source data indicative of a region comprising at least said part of Earth's surface from the data storage 550 based on said estimated position of the system 500. In some of these embodiment the estimated position of the system 500 is obtained from a navigation system of a flying platform the system 500 is comprised in and/or is based on at least one previous position determined by the system 500. An advantage of utilizing an estimated position of the system 500, even if its error margins are large, may be to obtain source data indicative of a smaller region of Earth's surface while still reliably including the part of Earth's surface corresponding to the 3D reconstruction, thereby reducing computational complexity in matching.

Returning to FIG. 2b and FIG. 5, an example scenario using a system 500 for determining a position and an orientation will be described. In said example scenario said system 500 is comprised in a drone flying platform, hereafter called the drone. The system 500 comprises a set of sensors 510 comprising one camera 511 arranged to capture a plurality of images of Earth's surface, and an inertial navigation system, INS, 512 arranged to provide navigational data of said drone. The system 500 further comprises a processor 520 and a data storage 550. The processor 520 is connected to the set of sensors 510 and the data storage 550. The data storage 550 comprises source data 260 corresponding to at least some of Earth's surface wherein source data 260, and in this example scenario the source data 260 corresponds to a large area of Earth's surface substantially centred on the drones position. The source data 260 in the data storage 550 comprises digital surface model, DSM, 270 and orthophoto 280 information.

If only utilizing an inertial navigation system (INS) 512 the drone starting from a known position and orientation is able to continuously determine its current position and orientation based on navigation data from the INS 512 with its navigation system, however, unless the position and the orientation is updated with reliable values the cumulative errors from the INS 512 will increase over time. In the example scenario the system 500 for determining a position and an orientation is comprised in the drone, and is arranged to provide a determined position and an orientation at regular intervals to limit the cumulative errors of the INS 512.

This example scenario starts with the drone flying above Earth's surface, and at least one criteria for requesting updated position and orientation information has been fulfilled, whereby the system 500 for determining a position and an orientation is initiated. The system 500 obtains sensor data 210 by capturing a plurality of images of a part of Earth's surface with said camera 511 and obtains corresponding navigation data from the INS 512. The navigation data comprises at least one gravity vector indicative of a downward direction during image capture. The processor 520 utilizes a SLAM algorithm in order to form a 3D reconstruction 220 of said part of Earth's surface based on the obtained sensor data 210. From forming the 3D reconstruction 220 a relationship between the 3D reconstruction's positions and orientation and the drone's positions and orientation for at least some points in time are established.

The processor 520 obtains source data 260 corresponding to a region comprising at least said part of Earth's surface from the storage module 550. In this example scenario the processor 520 is arranged to obtain an estimated position of the drone from the drone's navigation system, and to obtain source data 260 corresponding to a region based on said estimated position of the drone. The obtained source data 260 is a subset of the source data 260 in the storage module 550, such as obtaining source data for a province while the storage module 550 comprises source data for the corresponding country. The obtained source data 260 of said region comprises a corresponding source digital surface model, DSM, 270 and a corresponding orthophoto 280 in a coordinate system according to the World Geodetic System, WGS84. The processor 520 determines a two-channel source map 261 with the first and the second channel based on the source DSM 270 and the orthophoto 280 respectively.

In this example scenario the processor 520 determines a two-channel sensor map 221 based on the formed 3D reconstruction 220, wherein the first channel and the second channel of the sensor map 221 is a sensor DSM 230 and a sensor texture 240 determined based on the formed 3D reconstruction 220. In this example scenario the processor 520 determines the sensor DSM 230 and the sensor texture 240 further based on the at least one gravity vector, whereby the sensor DSM 230 and the sensor texture 240 substantially have the same downward direction as the source DSM 270 and the orthophoto 280. In this example scenario the spatial resolution per unit length of the sensor map 221 is substantially the same as the spatial resolution per unit length for the source map 261, and the source map 261 has significantly lower spatial resolution per unit length than the source data 260 in the storage module 550 in order to reduce computational complexity.

The processor 520 matches the sensor map 221 and the source map 261 utilizing a one-shot detection network based one-shot learning arranged to find the part of Earth's surface corresponding to the sensor map 221 inside the region of Earth's surface corresponding to the source map 261. The processor 520 determines the position and the orientation of the 3D reconstruction 220 based on the matching. The determined position and orientation of the 3D reconstruction 220 may be directly used to update the INS based navigation system of the drone utilizing the established relationship between the 3D reconstruction and the drone, however, in this example scenario the processor 520 continues by refining the determined position and orientation of the 3D reconstruction 220.

The processor 520 obtains a source DSM 270 for an area around the determined position of the highest available spatial resolution from the storage module 550, wherein said area is significantly smaller than the region of Earth's surface corresponding to the source map 261.

The processor 520 matches the 3D reconstruction 220 and the obtained source DSM 270 for said area, wherein in this example matching comprises adjusting the position and the orientation of the 3D reconstruction from the determined position and orientation in order to better match the source DSM 270 for said area. The processor 520 determines a refined position and orientation of the 3D based on said refining matching, whereby an updated position and orientation may be provided to the navigation system of the drone.

In some use examples the system 500 is used for drone reconnaissance during GPS denied operations, anti GPS spoof detection, and/or navigation redundancy for critical autonomous systems.

The invention claimed is:

1. A method for determining a position and an orientation, the method (300) comprises the steps of
    obtaining (310) sensor data (210) comprising a plurality of images of Earth's surface from at least one calibrated camera;
    forming (320) a 3D reconstruction (220) of a part of Earth's surface based on obtained sensor data (210);
characterized by
    obtaining (330) from a data storage (250), source data (260) indicative of a region comprising at least said part of Earth's surface, wherein said source data (260) comprises
    a source digital surface model, DSM, (270) for said region, and
    an orthophoto (280) of said region,
wherein said source DSM (270) and said orthophoto (280) are defined in relation to a predetermined coordinate system;
    determining (340*a*) a sensor DSM (230) of the 3D reconstruction (220) and a sensor texture (240) of the 3D reconstruction (220) based on the 3D reconstruction (220);
    matching (350) the sensor DSM (230) and the sensor texture (240) with the source DSM (270) and the orthophoto (280), wherein matching comprises finding a position and an orientation of the sensor DSM (230) and the sensor texture (240) in the source DSM (270) and the orthophoto (280); and
    determining (360) the position and the orientation of the 3D reconstruction (220) in said predetermined coordinate system based on the matching (350) of the sensor DSM (230) and the sensor texture (240) with the source DSM (270) and the orthophoto (280).

2. The method according to claim 1, further comprising determining (340*b*) a two-channel sensor map (221),
    wherein the first channel of the sensor map (221) is the sensor DSM (230) or a transformation thereof, and
    wherein the second channel of the sensor map (221) is the sensor texture (240) or a transformation thereof, and
    determining (340*c*) a two-channel source map (261),
    wherein the first channel of the source map (261) is the source DSM (270) or a transformation thereof, and
    wherein the second channel of the source map (261) is the orthophoto (280) or a transformation thereof, and
    wherein matching (350) comprises matching (350*a*) the sensor map (221) with the source map (261).

3. The method according to claim 1, further comprising determining (370) a refined position and a refined orientation of the determined position and the determined orientation of the 3D reconstruction (220) based on matching the 3D reconstruction (220) with height information of the source DSM (270) at at least the determined position and/or in the determined orientation.

4. The method according to claim 1, wherein said sensor data (210) comprises the plurality of images of Earth's surface and corresponding navigation data obtained from an inertial navigation system (INS) and/or an inertial measurement unit (IMU).

5. The method according to claim 1, wherein obtaining (310) sensor data (210) further comprises obtaining at least one gravity vector indicative of a downward direction, and wherein determining (340*a*) the sensor DSM (230) of the 3D reconstruction (220) and the sensor texture (240) of the 3D reconstruction (220) is further based on said at least one gravity vector.

6. The method according to claim 1, wherein forming (320) the 3D reconstruction (220) of the part of Earth's surface utilizes a Simultaneous Localization and Mapping, SLAM, algorithm.

7. The method according to claim 6, wherein the algorithm is a one-shot detection network based one-shot learning arranged to find the part of Earth's surface corresponding to the sensor data (210) inside the region of Earth's surface corresponding to the source data (260).

8. A computer program product comprising a non-transitory computer-readable storage medium (412) having thereon a computer program comprising program instructions, the computer program being loadable into a processor (411) and configured to cause the processor (411) to perform the method (300) for determining a position and an orientation according to claim 1.

9. A system for determining a position and an orientation, the system (500) comprising a set of sensors (510), a processor (520) and a data storage (550), wherein the data storage (550) and the set of sensors (510) are connected to the processor (520), wherein the set of sensors (510) comprises a set of cameras (511) arranged to capture a plurality of images of Earth's surface and comprises an inertial navigation system (INS) and/or an inertial measurement unit (IMU) (512) arranged to determine changes in position and orientation of the system (500), wherein the set of sensors (510) is arranged to provide sensor data (210) comprising said plurality of images and corresponding navigation data indicative of changes in position and orientation to the processor (520), wherein the memory storage (550) is arranged to provide source data (260) for at least some of Earth's surface to the processor (520), wherein the source data (260) comprises a source DSM (270) indicative of the height of Earth's surface and a corresponding orthophoto (280) of Earth's surface, wherein the processor (520) is arranged to
    obtain sensor data (210) from the set of sensors (510);
    form a 3D reconstruction (220) of a part of Earth's surface based on obtained sensor data (210);
    obtain source data (260) corresponding to a region comprising at least said part of Earth's surface from the data storage (550), wherein said source data (260) comprises a corresponding source digital surface model, DSM, (270) and the corresponding orthophoto (280) in a predetermined coordinate system;
    determine a sensor DSM (230) and a sensor texture (240) based on the formed 3D reconstruction (220);
    match the sensor DSM (230) and the sensor texture (240) with the source DSM (270) and the orthophoto (280), wherein matching comprises finding a position and an orientation of the sensor DSM (230) and the sensor texture (240) in the source DSM (270) and the orthophoto (280); and determine a position and an orientation of the 3D reconstruction (220) in said predetermined coordinate system of the source data (260) based on said matching.

10. The system according to claim 9, wherein the processor (520) is further arranged to determine a two-channel sensor map (221), wherein the first channel of the sensor map (221) is the sensor DSM (230) or a transformation thereof, and wherein the second channel of the sensor map (221) is the sensor texture (240) or a transformation thereof, determine a two-channel source map (261), wherein the first channel is the source DSM (270) or a transformation thereof, and wherein the second channel is the orthophoto (280) or a transformation thereof, match the sensor map (221) with the source map (261); and determine the position and the orientation of the 3D reconstruction (220) based on the matching of the sensor map (221) with the source map (261).

\* \* \* \* \*

UNITED STATES PATENT AND TRADEMARK OFFICE
CERTIFICATE OF CORRECTION

| | |
|---|---|
| PATENT NO. | : 12,000,703 B2 |
| APPLICATION NO. | : 18/553806 |
| DATED | : June 4, 2024 |
| INVENTOR(S) | : Viktor Ringdahl |

It is certified that error appears in the above-identified patent and that said Letters Patent is hereby corrected as shown below:

On the Title Page
In Column 2, Item (57), Abstract, Line 6, delete "apart" and insert -- a part --, therefor.

In the Claims
In Column 15, Line 55, Claim 2, delete "thereof," and insert -- thereof; --, therefor.
In Column 17, Line 10, Claim 10, delete "thereof," and insert -- thereof; --, therefor.
In Column 17, Line 14, Claim 10, delete "thereof," and insert -- thereof; --, therefor.

Signed and Sealed this
Twelfth Day of November, 2024

Katherine Kelly Vidal
*Director of the United States Patent and Trademark Office*